(12) United States Patent
Lancaster

(10) Patent No.: US 7,529,360 B2
(45) Date of Patent: May 5, 2009

(54) METHOD AND SYSTEM FOR CONNECTING CALLS

(75) Inventor: William S. Lancaster, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 946 days.

(21) Appl. No.: 10/704,605

(22) Filed: Nov. 12, 2003

(65) Prior Publication Data

US 2005/0100154 A1    May 12, 2005

(51) Int. Cl.
H04M 3/42    (2006.01)
H04M 1/00    (2006.01)

(52) U.S. Cl. .................. 379/218.01; 455/551; 455/556.2

(58) Field of Classification Search ............ 379/218.01, 379/112.01, 111, 93.17; 707/1; 705/14; 455/466, 556.2, 551, 418, 558
See application file for complete search history.

(56) References Cited

U.S. PATENT DOCUMENTS

| 5,483,586 | A | 1/1996 | Sussman |
| 5,754,634 | A * | 5/1998 | Kay et al. ............... 379/112.01 |
| 6,577,714 | B1 * | 6/2003 | Darcie et al. ............. 379/93.17 |
| 7,200,413 | B2 * | 4/2007 | Montemer et al. .......... 455/466 |
| 2002/0029178 | A1 | 3/2002 | Wiederin et al. |
| 2004/0019582 | A1 * | 1/2004 | Brown .......................... 707/1 |
| 2004/0213389 | A1 * | 10/2004 | Ljubicich et al. ............ 379/111 |
| 2004/0260604 | A1 * | 12/2004 | Bedingfield, Sr. ............ 705/14 |
| 2007/0124207 | A1 * | 5/2007 | Faber et al. .................... 705/14 |

FOREIGN PATENT DOCUMENTS

| GB | 2264611 |  | 9/1993 |
| GB | 2378348 | A | 2/2003 |
| JP | 63191451 | A | 8/1988 |
| JP | 11191816 | A | 7/1999 |
| JP | 11266326 | A | 9/1999 |
| JP | 2002064654 |  | 2/2002 |

OTHER PUBLICATIONS

International Search Report issued Mar. 22, 2005 in counterpart foreign application in Great Britain under application No. GB0424630.2.

* cited by examiner

Primary Examiner—Thjuan K Addy

(57) ABSTRACT

An apparatus and a method for connecting calls from a digital directory. The system includes a telecommunication appliance and a digital directory, in communication with and accessible by the telecommunication appliance. The telecommunication appliance includes a display, a user input, and, means for making a call. The digital directory includes a plurality of digital directory entries, wherein each digital directory entry includes information about a business. The telecommunication appliance displays at least some of the digital directory entries from the digital directory on the display, receives a user selection of one of the digital directory entries representing a selected business via the user input, and makes a call to the selected business using the means for making a call and the information about the selected business.

21 Claims, 5 Drawing Sheets

US 7,529,360 B2

METHOD AND SYSTEM FOR CONNECTING CALLS

BACKGROUND

Presently, consumers typically obtain business phone numbers using a traditional, large and cumbersome "yellow-pages" phonebook. A consumer browses through the phonebook looking for the category of business that the consumer desires. After locating the category, the consumer selects one or more businesses from the listings provided in the category. The consumer then manually dials the number of the selected business. This inefficient process, therefore, requires many steps for the consumer to contact a business.

Businesses pay fees to have their phone numbers listed in the yellow-pages phonebooks. Many businesses pay additional fees to include an advertisement in the phonebook that is designed to increase the chances that the consumer will select their business. Businesses often incur substantial costs to pay a professional advertising agency to design their ad. The only way that a business can measure whether their advertisements, and hence the additional fees and costs, generate phone calls is to directly ask consumers that call them how they were referred to their business. This is a cumbersome, inefficient and unreliable approach.

SUMMARY

Disclosed in an embodiment is a system for connecting calls. The system includes a telecommunication appliance and a digital directory, in communication with and accessible by the telecommunication appliance. The telecommunication appliance includes a display, a user input, and, means for making a call. The digital directory includes a plurality of digital directory entries. Each digital directory entry includes information about a business. The telecommunication appliance displays at least some of the digital directory entries from the digital directory on the display, receives a user selection of one of the digital directory entries representing a selected business via the user input, and makes a call to the selected business using the means for making a call and the information about the selected business.

Also disclosed in another embodiment is a method for connecting calls. The method includes accessing a digital directory using a telecommunication appliance. The digital directory includes digital directory entries. Each digital directory entry includes information about a business. The method further includes displaying at least some of the digital directory entries on a display of the telecommunication appliance, receiving a user selection of one of the displayed digital directory entries, and connecting a call from the user to the selected business.

Further disclosed in another embodiment is a computer-readable medium that includes instructions for executing a method for connecting calls. The instructions execute the step of accessing a digital directory using a telecommunication appliance. The digital directory includes digital directory entries. Each digital directory entry includes information about a business. The instructions further execute steps of displaying at least some of the digital directory entries on a display of the telecommunication appliance, receiving a user selection of one of the displayed digital directory entries, and connecting a call from the user to the selected business.

DETAILED DESCRIPTION

Figure 1:
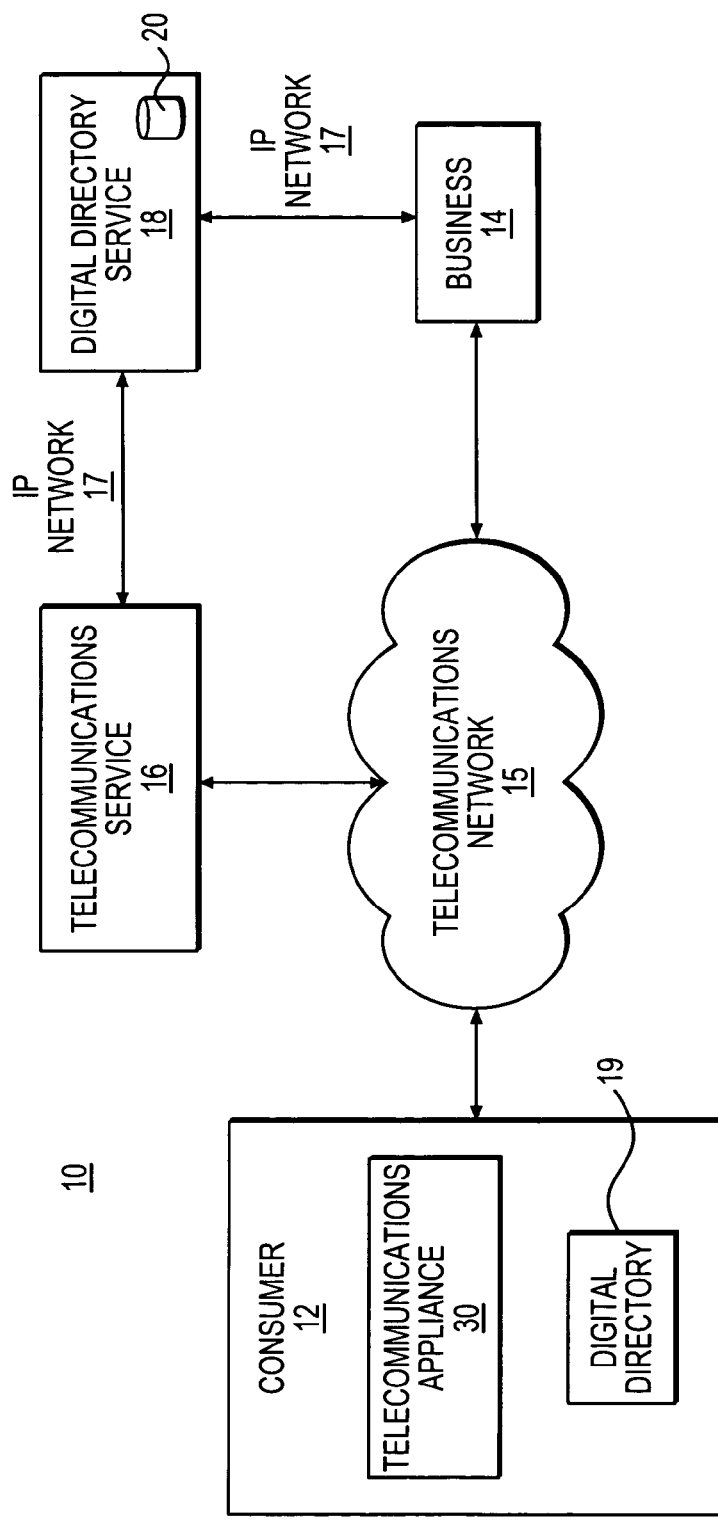
FIG. 1 is a block diagram illustrating an embodiment of a system for connecting and recording calls from a digital directory.

FIG. 1 shows a system 10 for connecting and recording calls from a digital directory, in accordance with an embodiment. The system 10 shown includes consumers, for example consumer 12, with telecommunication appliances 30 (e.g., personal data assistants (PDAs, mobile phones, mobile electronic mail devices (e.g., a Blackberry™), etc.), a number of businesses, for example business 14, a telecommunications service 16 for connecting consumer 12 to business 14, and a digital directory service 18. Consumer 12 may be any entity, such as an individual, a business, an organization, etc. Consumer 12, business 14 and telecommunications service 16 are connected via a network 15. The network 15 may be a telephony network such as an SS7 network, an IP network supporting voice-over-IP or other similar telecommunication networks. Telecommunications service 16 and business 14 preferably connect to the digital directory service 18 via a network such as IP network 17.

With continued reference to FIG. 1, the consumer 12 in system 10 shown selects business 14 from a list of businesses displayed on a telecommunication appliance (not shown in FIG. 1). The list of businesses displayed on the telecommunication appliance is obtained from digital directory 19. Digital directory 19 is an electronically recorded directory of businesses, on digital media, e.g., CD-ROM, DVD-ROM, CD-R, DVD-R, CD-RW, USB memory sticks, etc. For each business in the digital directory 19, there is a digital directory entry. Digital directory 19 organizes and displays the digital directory entries alphabetically by category, as in a yellow-pages phonebook. Alternatively, the digital directory entries of digital directory 19 can be organized and displayed purely alphabetically, categorically (e.g., auto dealerships, restaurants, etc.), geographically or in any other manner.

In this embodiment, digital directory 19 is created by digital directory service 18. Digital directory service 18 includes a digital directory database 20 in which a digital directory entry for business 14 is created and stored (e.g., by business 14 or digital directory service 18 administrators). Each digital directory entry may include, for example, a business name, a description of the business, and/or an advertisement (e.g., a "print" ad, a multimedia, video, advertisement, etc.) for the business. Each digital directory entry may include an identification number identifying the business (e.g., a business id). The business id is generally not displayed on the telecommunication appliance 30 when the digital directory entries are displayed. The digital directory 18 is created by recording some or all of the digital directory entries in digital directory database 20 onto the selected digital media.

Associated with each digital directory entry in the digital directory database 20 is a log of transaction records for each call made to the business using the digital directory 19. The log can be accessed and metrics run on the log data to determine the effectiveness of the digital directory 19. Exemplary metrics include, for example, charts and graphs showing the number of calls made using the digital directory over time, the average length of each call, a comparison of the total number of calls (or over a period of time) made to a business using the digital directory compared to the average number of calls made per business using the digital directory, etc. The digital directory database 20 is accessible through the Internet in this embodiment, with a server supporting the digital directory service 18 acting as a web server for the digital directory database 20. Therefore, the log data can be accessed, e.g., by the business 14 through an Internet connection.

Returning to FIG. 1, when consumer 12 selects business 14, the telecommunications service 16 connects a call from consumer 12 to business 14 via network 15. The telecommunication appliance 30 may initiate a call to telecommunications service 16 via a modem connection to a landline or cellular phone or via its own wireless connection to network 15. Telecommunications service 16 also connects to digital directory service 18 to log a transaction record of the call from consumer 12 to business 14. The telecommunications service 16 connects to the digital directory service 18 through the Internet in this embodiment. A server (not shown) supporting the digital directory service then acts as an web service for the digital directory database 20, allowing the telecommunications service 16 to look up the business 14's digital directory database entry using methods known to one of ordinary skill in the art. The transaction record is logged in the log associated with each digital directory database entry. Business 14 can then access the digital directory entry for the business to view the log and metrics of each transaction.

Figure 2:
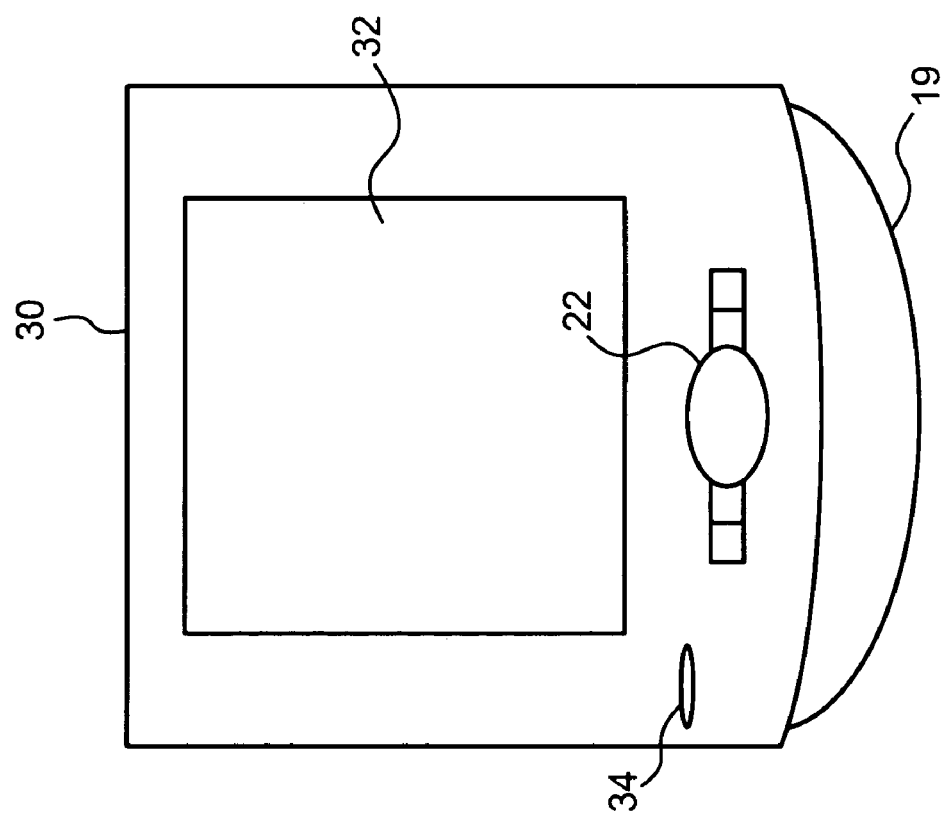
FIG. 2 illustrates an embodiment of a telecommunication appliance for use with a method and system for connecting and recording calls from a digital directory.

With reference now to FIG. 2, shown is a telecommunication appliance 30, in accordance with an embodiment. The telecommunication appliance 30 shown includes a processor (not shown), a memory (not shown) and a user input 22 (e.g., a keyboard and/or cursor control). Telecommunication appliance 30 also includes such additional features as a display 32, a Telephony Application Programming Interface (TAPI) compliant modem (not shown), a speaker 34 (the speaker 34 volume is adjustable) and a digital media drive capable of reading and accessing digital directory 19. In certain embodiments, the display 32 may be wider than a typical PDA display. For example, the display 32 is twice as wide as a typical PDA display. Likewise, the speaker 34 may have a maximum volume significantly louder than a typical PDA. The digital media drive in this embodiment is a CD or DVD drive, but it may be a drive capable of playing other digital media. The TAPI compliant modem enables a connection to a landline or cellular phone. The TAPI compliant modem, however, may be a wireless modem capable of connecting to a wireless network. The telecommunication appliance 30 may also include a wireless phone or other device capable of sending and receiving voice and other signals wirelessly.

The telecommunication appliance 30 shown also includes software, e.g., stored in the memory and executed by the processor, capable of displaying a listing of entries of the digital directory 19 and allowing the user to select a digital directory entry for calling. When the customer 12 selects a digital directory entry for calling, the telecommunication appliance 30 initiates a call (e.g., via the TAPI-compliant modem) to the telecommunications service 16.

Figure 3:
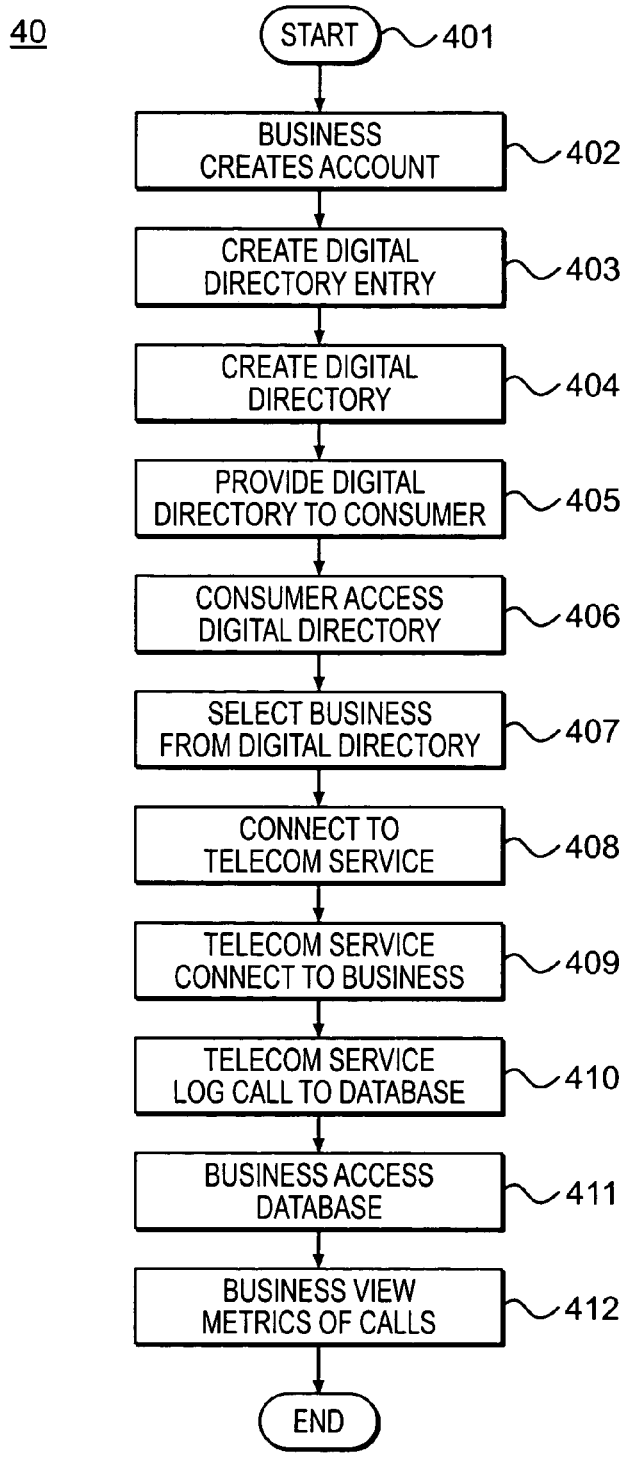
FIG. 3 is a flowchart of an embodiment of a method for connecting and recording calls from a digital directory.

With reference now to FIG. 3, shown is a method 40 for connecting or recording calls from a digital directory, in accordance with an embodiment. The method 40 starts at block 401. A business, such as business 14 shown in FIG. 1, creates an account with the digital directory service 18, block 402. Then a digital directory entry for business 14 is created (e.g., by an administrator of the digital directory service 18 or business 14), block 403. Blocks 402-403 may be repeated for a plurality of other businesses. The digital directory service 18 then collects the digital directory database entries and creates a digital directory 19 from the entries, block 404. This block may be accomplished simply by recording on a recordable digital media all or some of the entries in the digital directory database 20. Each digital directory database entry may include a business name, a description of the business, a business id, an advertisement, and other information. The information included with each digital directory database entry is generally included in the digital directory 19. Business 14 may update its digital directory entry at any time. Indeed, a new digital directory 19 may be created at any time or periodically with updated entries, new entries and/or with entries removed.

With continued reference to FIG. 3, the digital directory 19 is provided to consumer 12, block 405. Consumer 12 accesses the digital directory 19, e.g., through telecommunication appliance 30, block 406. Consumer 12 selects business 14 from digital directory 19, e.g., using the telecommunication appliance 30, block 407. The consumer 12 connects to the telecommunications service 16, e.g., using the telecommunication appliance 30, block 408. The telecommunications service 16 connects consumer 12 to business 14, block 409. The telecommunications service 16 logs the call with the digital directory service 18, block 410. This block saves a record of the call with the digital directory entry of the business 14.

Business 14 may later access the digital directory service 18, block 411. For example, the business 14 may connect (e.g., using a computer with an Internet connection) to the Internet and, through the Internet, to the digital directory service, which then provides access to the digital directory database 20 through means known to one of ordinary skill in the art, such as by running a database application on a remote web server or by providing the database application to the business 14 computer for execution. The digital directory database 20 shown includes logs of all calls made using the digital directory to business 14. Consequently, business 14 may view various metrics (e.g., as described above) of the calls made using its entry in the digital directory 19, block 412. By viewing these metrics, business 14 can determine precisely how many calls were generated by the digital directory entry. This enables business 14 to determine the effectiveness and, therefore, the value of the digital directory entry. In certain embodiments, business 14 and/or telecommunication appliance 30 may transmit information to the digital directory service 18 indicating when a sale or purchase has been completed. The information indicating when a sale or purchase has been completed may also be entered into the digital directory database 20, enabling business 14, for example, to directly determine which and/or how many calls originating from the digital directory 16 generated a sale and to view metrics graphing or charting this sale information over time, comparing it to average sale information for the digital directory, etc.

Figure 4:
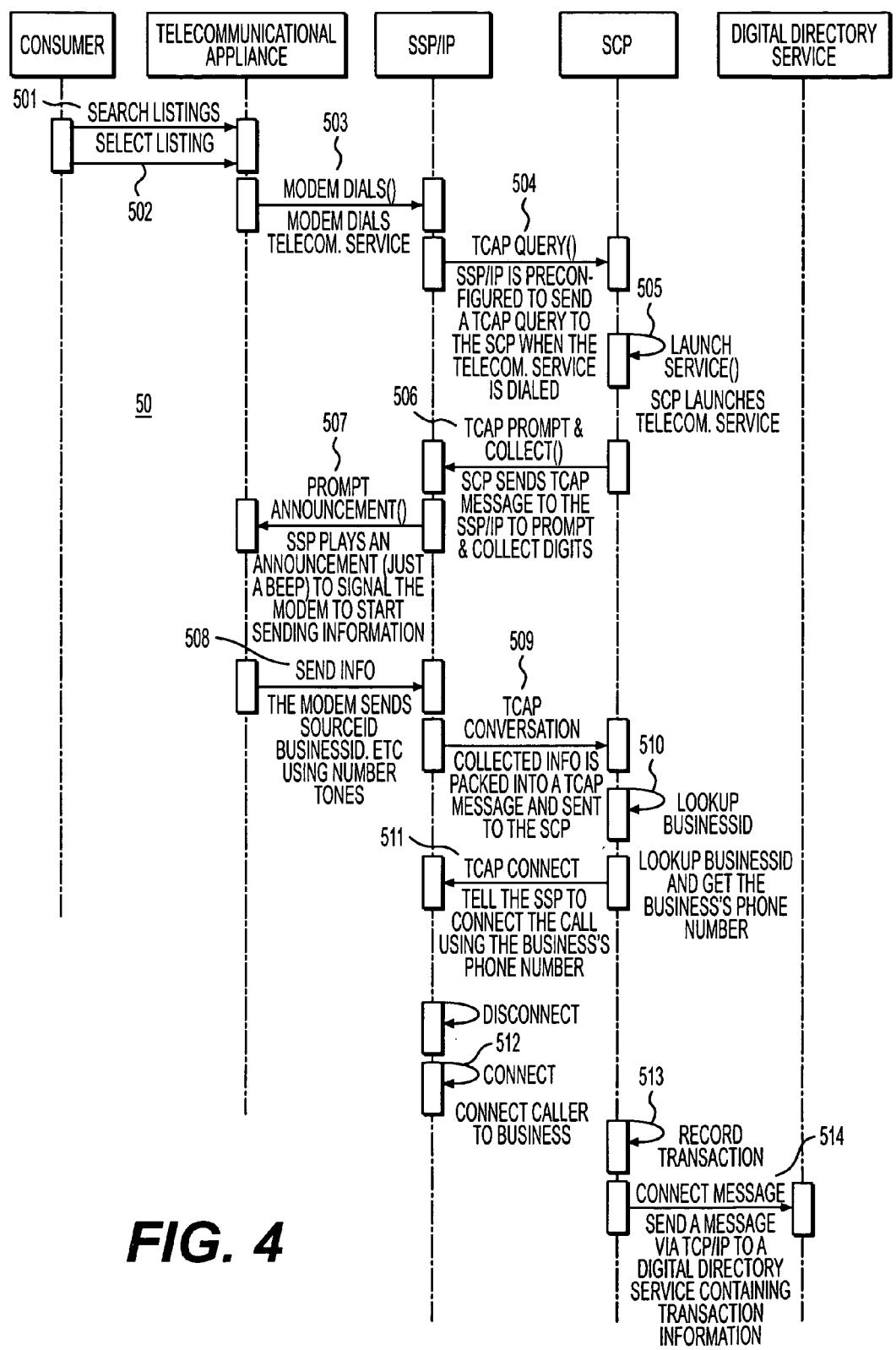
FIG. 4 is a sequence diagram illustrating an embodiment of a method and system for connecting and recording calls from a digital directory.

With reference now to FIG. 4, shown is a sequence diagram illustrating in greater detail an embodiment of a method 50 for connecting recorded calls from a digital directory. The method 50 shown in FIG. 4 assumes that consumer 12 already has a digital directory 19, created as described above, loaded into telecommunication appliance 30. As shown, consumer 12 first searches the listings in digital directory 19 as displayed on telecommunication appliance 30, line 501. Consumer 12 then selects a digital directory entry from the displayed listings, line 502. The listing may be selected, for example, by highlighting and clicking on a specific listing using a cursor control of telecommunication appliance 30. Once selected, telecommunication appliance 30 modem dials telecommunications service 16, line 503. Telecommunication appliance 30 includes software that recognizes the selection of a listing and automatically dials telecommunications service 16.

Telecommunication appliance 30's modem connects to a telecommunications switch, such as a service switching point (SSP) or a SSP/IP. The SSP/IP is preferably pre-configured to send a Transaction Capabilities Applications Part (TCAP) query to a service control point (SCP) at which telecommunications service 16 is located, line 504. Generally, a SCP is a node in a SS7 telephone network that provides an interface to associated database(s) that support the telecommunications service 16 (not shown). The SCP shown is a computer or server on which software providing telecommunications service 16 is loaded.

When the SCP receives the TCAP query, telecommunications service 16 is launched, as shown in FIG. 4, line 505. Launching telecommunications service 16 prompts the telecommunications service 16 to send a "prompt and collect" TCAP message back to the SSP/IP to prompt and collect digits identifying the selected business, line 506. The TCAP prompt and collect message triggers the SSP/IP to transmit an announcement to telecommunication appliance 30 to start sending the digits identifying the selected business, line 507. This announcement may be heard as a beep on the telecommunication appliance 30. The announcement triggers telecommunication appliance 30 to send the appropriate identifying digits back to the SSP/IP, line 508. The identifying digits include an identification number identifying the source PDA device (source id) and an identification number identifying the business (business id). These identification numbers may be sent using number tones. The SSP/IP receives these number tones and packages this information in a TCAP message that is sent to the SCP, line 509. The TCAP message is processed by the SCP and forwarded to the software providing telecommunications service 16. Upon receipt, telecommunications service 16 converts the tones into a number. Using the business id, telecommunications service 16 looks up business 14's phone number, line 510.

With continued reference to FIG. 4, the SCP then sends a TCAP connect message back to the SSP/IP to connect the call to business 14 using the business' phone number, line 511. The SSP/IP connects consumer 12 to business 14, line 512, and disconnects consumer 12 when the call is complete. Telecommunications service 16 also records the transaction in the digital directory database, i.e., the telephone call, using the source id, line 513. Telecommunications service 16 generally sends a connect message to digital directory service 18 containing the transaction information, line 514. Normally, this message is sent via TCP/IP over the Internet to the digital directory service 18. The transaction information is recorded with business 14 entry in the digital directory database 20.

Figure 5:
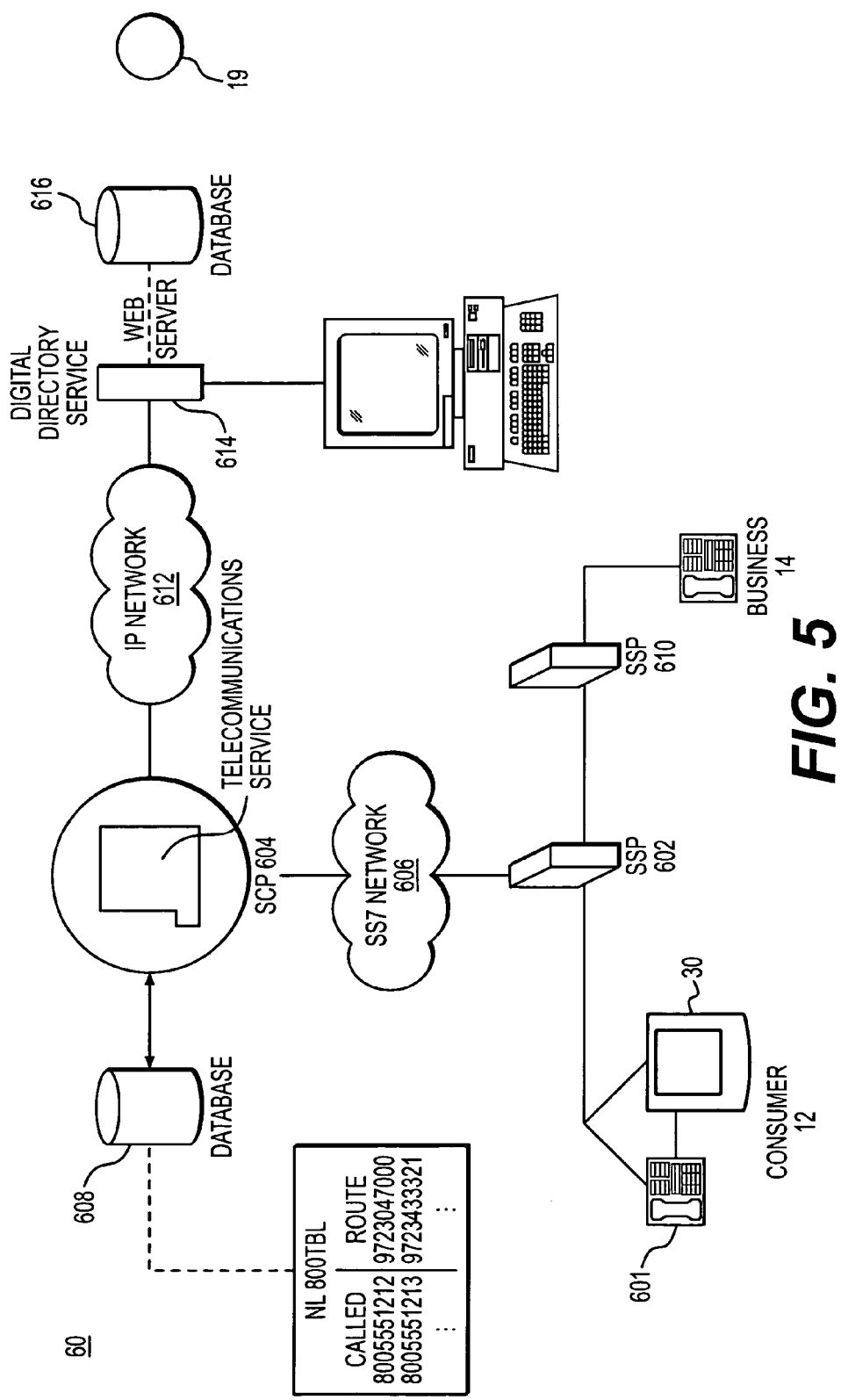
FIG. 5 is a diagram illustrating an embodiment of a system for connecting and recording call from a digital directory.

With reference now to FIG. 5, shown is a network diagram of an embodiment of a system 60 for connecting and recording calls from a digital directory. As shown, telecommunication appliance 30 is connected to a traditional land line phone 601. The telecommunications device 30 modem dials telecommunications service 16 through the land line connection to the SSP 602. Alternative embodiments may include telecommunication appliance 30 directly connecting to SSP 602 via a cellular connection or other wireless connection, through its own capabilities or a connected wireless phone. The telephone call from the telecommunication appliance 30 modem is received by SSP 602. SSP 602 then sends a TCAP query via the SS7 network, 606 to SCP 604, which supports telecommunications service 16. SCP 604 sends a TCAP prompt and collect message back to SSP 602 via the SS7 network 606. Once the source id and business id have been received from the telecommunication appliance 30, SSP 602 sends the collected information in a TCAP message to the SCP 604. Telecommunications service 18 at SCP 604 then looks up the business 14 phone number using the associated database 608. Using business 14's phone number, the SCP 604 sends a TCAP connect message to SSP 610 directing SSP 610 to connect the call to business 14. SSP 610 associated with business 14 may be SSP associated with consumer 12 or a different SSP located elsewhere in the SS7 network 606.

Once the call is complete, the telecommunications service 16 records the transaction and sends a TCP/IP message via the IP network 612 to a web server supporting the digital directory service 18. The digital directory service 18 records the transaction in the digital directory database 20. Business may connect to the digital directory service 18 by sending TCP/IP messages via TCP/IP to web server 614. As described above, business 14 may connect to the digital directory service 18 to retrieve information such as metrics regarding calls generated from the digital directory 19 or to transmit additional information such as information describing sales generated from such calls.

The foregoing description provides illustration and description, but is not intended to be exhaustive or to limit the invention to the embodiments disclosed. Modifications and variations are possible consistent with the above teachings or may be acquired from practice of the embodiments disclosed. Therefore, it is noted that the scope is defined by the claims and their equivalents.

The invention claimed is:

1. A system for connecting calls, comprising:
    a telecommunication appliance including
        a display;
        a user input; and
        means for making a call;
    a digital directory, which is in communication with and accessible by the telecommunication appliance, and includes a plurality of digital directory entries;
    wherein
        a digital directory entry includes information about a business, and
        the telecommunication appliance
            displays some of the digital directory entries from the digital directory on the display;
            receives a user selection of a digital directory entry representing a selected business via the user input, wherein the information about the selected business includes a business id; and
            makes a call to the selected business using the means for making a call and the information about the selected business from the selected digital directory entry;
    a telecommunications service, which is connected to the telecommunication appliance via a network and looks up the selected business phone number using the business id, and connects the call to the selected business; and
    a digital directory service, which is connected to the telecommunications service with an Internet Protocol (IP) network and includes a digital directory database that includes a plurality of digital directory entries corresponding to the plurality of digital directory entries on the digital directory, wherein the telecommunications service communicates a record of the call to the selected business for recording with the corresponding digital directory entry in the digital directory database.

2. The system of claim 1, further comprising:
a telephone operably connected to the telecommunication appliance, wherein the means for making the call is a modem that opens a connection to the telephone and dials a number to connect to the business.

3. The system of claim 1, wherein the telecommunication appliance is an appliance chosen from a list consisting of: a personal data assistant (PDA), a mobile phone, and a mobile electronic mail device.

4. The system of claim 1, wherein the digital directory is a CD-ROM, the telecommunication appliance includes a CD-ROM drive, and the digital directory is inserted into the CD-ROM.

5. The system of claim 1, wherein the digital directory is a DVD-ROM, the telecommunication appliance includes a DVD-ROM drive, and the digital directory is inserted into the DVD-ROM.

6. The system of claim 1, wherein the digital directory is chosen from a list consisting of: a CD-ROM, a DVD-ROM, a CD-R, a DVD-R, a CD-RW, a memory stick, and a USB memory stick.

7. The system of claim 1, wherein the means for making a call is a phone.

8. A method for connecting calls from a digital directory, comprising:
accessing a digital directory using a telecommunication appliance, wherein the digital directory includes a plurality of digital directory entries, and a digital directory entry including information about a business;
displaying some of the plurality of digital directory entries on a display of the telecommunication appliance, wherein a digital directory entry in the digital directory includes a business id;
receiving a user selection of a displayed digital directory entry, wherein the selected digital directory entry represents a selected business;
connecting a call from the user to the selected business, wherein the connecting step includes:
the telecommunication appliance connecting to a telecommunications service based on the received user selection;
the telecommunications service transmitting a request for the selected digital directory entry business id to the telecommunication appliance;
the telecommunication appliance providing the requested business id to the telecommunications service;
the telecommunications service looking up the phone number of the selected business using the business id of the selected digital directory entry; and
the telecommunications service dialing the business with the phone number and opening a connection between the business and the user;
connecting to a digital directory service when the telecommunication appliance connects to the telecommunication service; and
transmitting information to the digital directory service regarding the call from the user to the business.

9. The method of claim 8, wherein the connecting step includes:
the telecommunication appliance making a call based on the received user selection.

10. The method of claim 8, wherein the digital directory service includes a digital directory database that includes a plurality of digital directory entries corresponding to the plurality of digital directory entries on the digital directory, the method further comprising:
recording the information regarding the call with the corresponding digital directory entry in the digital directory database.

11. The method of claim 10, further comprising:
connecting to the digital directory service;
accessing the digital directory database; and
viewing the information regarding the call.

12. The method of claim 8, further comprising:
a business accessing a digital directory service via an internet connection, wherein the digital directory service includes a digital directory database;
creating a digital directory entry;
storing the digital directory entry in the digital directory database; and
repeating the accessing, creating and storing steps for a plurality of business, whereby a plurality of digital directory entries are stored in the digital directory database.

13. The method of claim 12, further comprising:
creating the digital directory by saving the plurality of digital directory entries on a digitally-recordable media.

14. The method of claim 8, wherein the telecommunication appliance is chosen from a list consisting of: a personal data assistant (PDA), a mobile phone, and a mobile electronic mail device.

15. The method of claim 8, wherein the digital directory is a CD-ROM, the telecommunication appliance includes a CD-ROM drive, and the digital directory is inserted into the CD-ROM.

16. The method of claim 8, wherein the digital directory is a DVD-ROM, the telecommunication appliance includes a DVD-ROM drive, and the digital directory is inserted into the DVD-ROM.

17. The method of claim 8, wherein the digital directory is chosen from a list consisting of: a CD-ROM, a DVD-ROM, a CD-R, a DVD-R, a CD-RW, a memory stick, and a USB memory stick.

18. A computer-readable medium encoded with instructions capable of being executed by a computer for a method comprising:
accessing a digital directory using a telecommunication appliance, wherein the digital directory includes a plurality of digital directory entries, and a digital directory entry including information about a business;
displaying some of the plurality of digital directory entries on a display of the telecommunication appliance, wherein a digital directory entry in the digital directory includes a business id;
receiving a user selection of a displayed digital directory entry, wherein the selected digital directory entry represents a selected business;
connecting a call from the user to the selected business, wherein the connecting step includes:
the telecommunication appliance connecting to a telecommunications service based on the received user selection;
the telecommunications service transmitting a request for the selected digital directory entry business id to the telecommunication appliance;

the telecommunication appliance providing the requested business id to the telecommunications service;

the telecommunications service looking up the phone number of the selected business using the business id of the selected digital directory entry; and the telecommunications service dialing the business with the phone number and opening a connection between the business and the user;

connecting to a digital directory service when the telecommunication appliance connects to the telecommunication service; and transmitting information to the digital directory service regarding the call from the user to the business.

19. The computer-readable medium of claim 18, wherein the instructions for executing the connecting step include instructions for:

the telecommunication appliance making a call based on the received user selection.

20. The computer-readable medium of claim 18, wherein the digital directory is chosen from a list consisting of: a CD-ROM, a DVD-ROM, a CD-R, a DVD-R, a CD-RW, a memory stick, and a USB memory stick.

21. The computer-readable medium of claim 18, wherein the computer-readable medium is a memory in the telecommunications appliance.

* * * * *